United States Patent
Kushtagi et al.

(10) Patent No.: US 11,449,582 B2
(45) Date of Patent: Sep. 20, 2022

(54) AUDITABLE SECURE TOKEN MANAGEMENT FOR SOFTWARE LICENSING/SUBSCRIPTION

(71) Applicant: Autodesk, Inc., San Francisco, CA (US)

(72) Inventors: Harsha Raghavendra Kushtagi, Singapore (SG); Pradeep Kumar, Singapore (SG)

(73) Assignee: AUTODESK, INC., San Francisco, CA (US)

( * ) Notice: Subject to any disclaimer, the term of this patent is extended or adjusted under 35 U.S.C. 154(b) by 248 days.

(21) Appl. No.: 16/658,441

(22) Filed: Oct. 21, 2019

(65) Prior Publication Data

US 2021/0117514 A1   Apr. 22, 2021

(51) Int. Cl.
*G06F 21/10* (2013.01)
*H04L 9/08* (2006.01)
*H04L 9/32* (2006.01)

(52) U.S. Cl.
CPC .......... *G06F 21/105* (2013.01); *H04L 9/0825* (2013.01); *H04L 9/3213* (2013.01); *G06F 2221/0711* (2013.01)

(58) Field of Classification Search
None
See application file for complete search history.

(56) References Cited

U.S. PATENT DOCUMENTS

| 2010/0153951 A1* | 6/2010 | Jones ............ G06F 11/3089 718/100 |
| 2015/0072767 A1* | 3/2015 | Montenegro ...... G07F 17/3218 463/31 |
| 2018/0337794 A1* | 11/2018 | Casaletto ............ H04L 43/10 |

OTHER PUBLICATIONS

"Hardware security module", https://en.wikipedia.org/wiki/Hardware_security_module, last edited on Oct. 7, 2019, pp. 1-7.
"Open Enclave SDK", https://openenclave.io/sdk/, as downloaded Oct. 22, 2019, pp. 1-3.
"Intel® Software Guard Extensions Tutorial Series: Part 1 Intel® SGX Foundation| Intel® Software", https://software.intel.com/content/www/us/en/develop/articles/intel-software-guard-extensions-tutorial-part-1-foundation.html, pp. 1-11, as downloaded Oct. 14, 2019.

* cited by examiner

*Primary Examiner* — William J. Goodchild
(74) *Attorney, Agent, or Firm* — Gates & Cooper LLP

(57) ABSTRACT

A method, apparatus, and system provide the ability to license a software application. A software application is used on a client computer. Usage information for the software application is acquired and is used to generate an original token that is encrypted. The encrypted token is forwarded to a server computer for licensing authentication and processing. The encrypted token is audited on the client computer by selecting and receiving the token from a licensing service, verifying the token, and displaying the result of the verifying.

14 Claims, 8 Drawing Sheets

AUDITABLE SECURE TOKEN MANAGEMENT FOR SOFTWARE LICENSING/SUBSCRIPTION

BACKGROUND OF THE INVENTION

1. Field of the Invention

The present invention relates generally to software licensing and subscriptions, and in particular, to a system, method, apparatus, and article of manufacture for managing user auditable secure tokens in a consumption based software subscription licensing system

2. Description of the Related Art

Various licensing/subscription schemes/protocols may be utilized to authorize, activate, and use software on client and server computers. There are three common software licensing models—subscription, perpetual, and consumption based. A subscription is billed at periodic time intervals (e.g., each month/annum) regardless of use and is also referred to as "software as a service" (SaaS). A perpetual system enables a user to purchase the software and the purchaser may use it forever. In a consumption or pay-per-use software licenses, customers pay relative to their usage of the software. Embodiments of the invention address problems associated with a consumption/pay-per-use model. To better understand the problems of the prior art, a more detailed description of the desired functionality and use of a consumption based model may be useful.

With respect to functionality, it is desirable to provide flexibility and options (to customers) to enable the use of software on an on-demand basis. In addition, customers (e.g., small individual companies/firms) may prefer a no commitment on-demand basis payment plan. Further, such customers may desire to minimize the management of a required software product. In some scenarios, a customer may require a subset of software products (e.g., from a larger distributed set of products) on a short term basis (e.g., in order to champion a customer's idea, product, and innovation). However, it may not be known in advance, which product the user should subscribe to. Accordingly, payment flexibility and product usage flexibility are highly desirable. Further, token-based flexible models with large enterprises have resulted in positive feedback catalyzing a desire to provide a similar token-based model for individual, small, and medium size enterprises (i.e., traditional prior art systems fail to satisfy the needs of both large enterprises as well as needs for individual, small, and medium size enterprises). Accordingly, prior art systems that attempt to provide a consumption based systems (e.g., FLEXERA) fail to provide the flexibility needed to address emerging technologies, cloud based systems, and business needs of consumers.

In addition to the lack of flexibility, the consumption model comes with its own set of challenges. When enabling subscription workflows in a manner that is well suited for every customer, the major challenge is in trusting the consumption report. For example, with public utilities such as electricity meters at home or a gas pipe connection, customers should have full trust in the method of recording the usages to maintain a healthy billing. One key aspect of the public utilities is that the instrument is installed locally at a customer's house and the customer can always validate the billing with the usages at the customer's door step.

In a similar scenario to public utilities, one may examine the payment for a mobile device's consumption. The call records are all saved in the customer's mobile device and the records can be audited by the customer to confirm/verify the charges.

In view of the above, what is needed is a consumption based workflow for the licensing and subscription domain that enables auditability (e.g., by the user), flexibility to meet the rising business needs, and a security layer to ensure compliance with the licensing model for the software provider as well as the consumer.

SUMMARY OF THE INVENTION

Embodiments of the invention provide a mechanism to enable a software consumption based model that overcomes the problems of the prior art. Embodiments provide auditability support at the customer's doorstep/desktop with configurable policy support (the customer will be able to decrypt consumption information data at the customer's machine itself). The dependency on third party security is removed by providing flexibility in terms of a workflow implementation and full control/ownership of the workflows. Thus, embodiments of the invention define a workflow using client capabilities and provide auditability at a local customer computer with all of the secure historical data about consumption at the client (instead of taking data outside of the client and consolidating at a server).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Token Based Licensing

The token-based licensing model may be best understood as a variant of a floating license model. With a floating license model, when software is executed, a license key is checked out from a license server for the duration of execution. The software returns the license to the license server when the software is exited/has completed execution. For a token license, a token is generated instead of a license/license key—software products don't check out specific licenses, but instead check out one or more tokens that are applied towards the cost of the software license. Thus, a customer downloads one or more software products (e.g., as part of a suite of software products) and can use whichever software product is desired and the appropriate number of purchased tokens may be applied to enable the software product.

In view of the above, a token-based licensing model allows a user to buy a certain number of tokens for defined rational products that use the token-based licensing model. Tokens are consumed and released when a product checks the licenses in or out from a license server based on the same licensing policy.

Embodiments of the invention may categorize the tokens as soft currencies as they may be directly mapped to a company's revenue and profit. One issue that arises is with respect to the security of the tokens. Not many companies provide complete end-to-end security of/for the tokens. Furthermore, there may be a lack of trust if tokens are generated from usage data on the server (i.e., without the ability for the consumer to verify/confirm the usage data and token generation).

Outside of the consumption/token-based licensing, hardware based security mechanisms may also be utilized. For example, a hardware security module (HSM) is a physical computing device that safeguards and manages digital keys for strong authentication and may provide crypto-processing. HSMs may be implemented in the form of a plug-in card or external device that attaches directly to a computer or network server. While hardware based security is desired, it is undesirable to buy extra hardware (e.g., as part of an HSM system).

Figure 1:
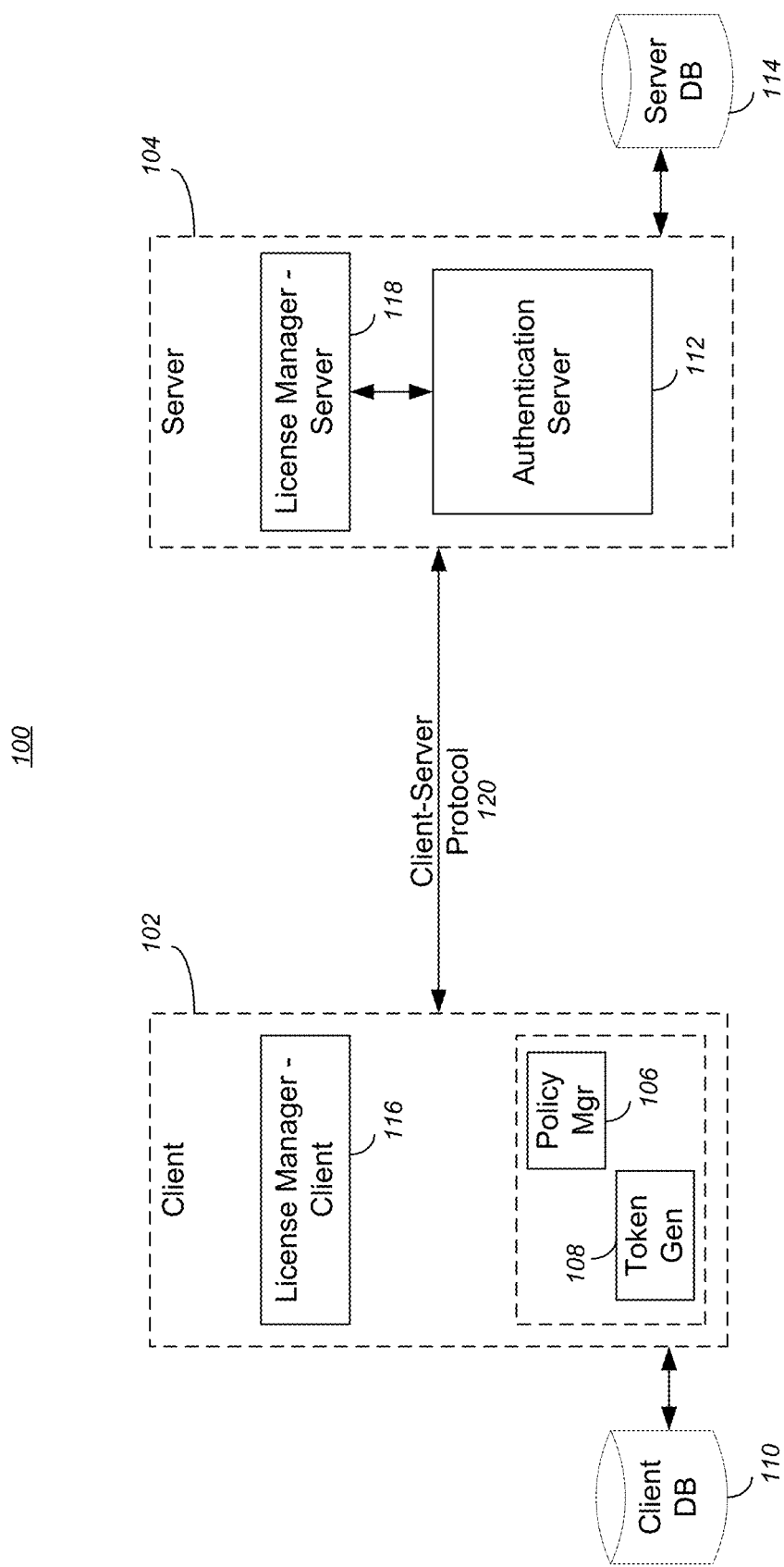
FIG. 1 illustrates a system architecture for a pay-per-use model with auditable secure token management in accordance with one or more embodiments of the invention.

In view of the above, embodiments of the invention provide a system architecture that is based on the token-based licensing model. FIG. 1 illustrates a system architecture for a pay-per-use model with auditable secure token management in accordance with one or more embodiments of the invention. The system 100 includes client 102 and server 104 components. The client 102 provides for a policy manager 106, a token generator 108, and secure storage in a client database/datastore 110. The policy manager 106 is responsible for acquiring all policies relating to how a token is valued and how many tokens are required. The token generator 108 retrieves information (e.g., a configuration) from the policy manager 106, and generates the tokens based on the information/configuration. Once the tokens are generated, they are stored on the client machine by encrypting them (e.g., using some hardware formed keys). The server 104 includes an authentication server 112, and a server database/datastore 114.

The process illustrated in FIG. 1 may utilize various forms of encryption/decryption both in generating the tokens and storing the tokens. In one or more embodiments, public-key cryptography (asymmetric cryptography) may be utilized. Such cryptography has a public key and a private key. For generating a digital signature, the private key can be used to sign and the public key to verify the signature. Alternatively, a public key can be used to encrypt and only a private key can be used for decryption. Asymmetric cryptography can be compared to symmetric cryptography in which a single key is used for encrypting and decrypting data.

In embodiments of the invention, the server database 114 is used to store an attestation public key, client public keys and client policy information. The client database 110 is used to store the encrypted attestation private keys, and a GUID (globally unique identifier) for a hardware component of the client 102. The license manager of the client 116 and license manager of the server 118 provide various functionality as set forth in further details herein. Further, the client 102 and server 104 communication based on a client-server protocol 120 that includes provisions for the attestation of the private kays and the policy information (e.g., token generation logic). The specific functions of the client 102 and server 104 are explained further below.

To enable further security in both the execution of the application/generation and storage/use of the tokens, embodiments of the invention may further utilize an INTEL SGX OR OPEN ENCLAVE model to protect selected code and data from disclosure or modification. The INTEL SGX OR OPEN ENCLAVE model provides for hardware-based memory encryption that isolates specific application code and data in memory. Further, it allows user-level code to allocate private regions of memory, called enclaves, that are designed to be protected from processes running at higher privilege levels. Stated in other words, developers can partition their application into processor-hardened enclaves or protected areas of execution in memory that can increase security even on compromised platforms. The following features describe attributes of an INTEL SGX OR OPEN ENCLAVE system utilized in accordance with one or more embodiments of the invention:

- Enclave memory cannot be read or written from outside the enclave regardless of the current privilege level and CPU mode.
- Production enclaves cannot be debugged by software or hardware debuggers (an enclave can be created with a debug attribute that allows a special debugger, the INTEL SGX OR OPEN ENCLAVE debugger, to view its content like a standard debugger, and this is intended to aid the software development cycle).
- The enclave environment cannot be entered through classic function calls, jumps, register manipulation, or stack manipulation. Instead, the only way to call an enclave function is through a new instruction that performs several protection checks.
- Enclave memory is encrypted using industry-standard encryption algorithms with replay protection. Tapping the memory or connecting the DRAM (dynamic random access memory) modules to another system will yield only encrypted data.
- The memory encryption key randomly changes every power cycle (for example, at boot time, and when resuming from sleep and hibernation states). The key is stored within the CPU and is not accessible.
- Data isolated within enclaves can be accessed by code that shares the enclave.

In view of the above, embodiments of the invention may build an application with trusted and untrusted parts. The application runs and creates an enclave which is then placed in trusted memory. The trusted function is called and execution may be transitioned to the enclave. The enclave can then see all process data in the clear while external access to the enclave is denied. When the function returns, the enclave data remains in trusted memory, and normal execution resumes.

Based on the above, embodiments of the invention may leverage the INTEL SGX OR OPEN ENCLAVE enclave or Open Enclave and protected memory features to provide for a token-based licensing schema/system.

Figure 2:
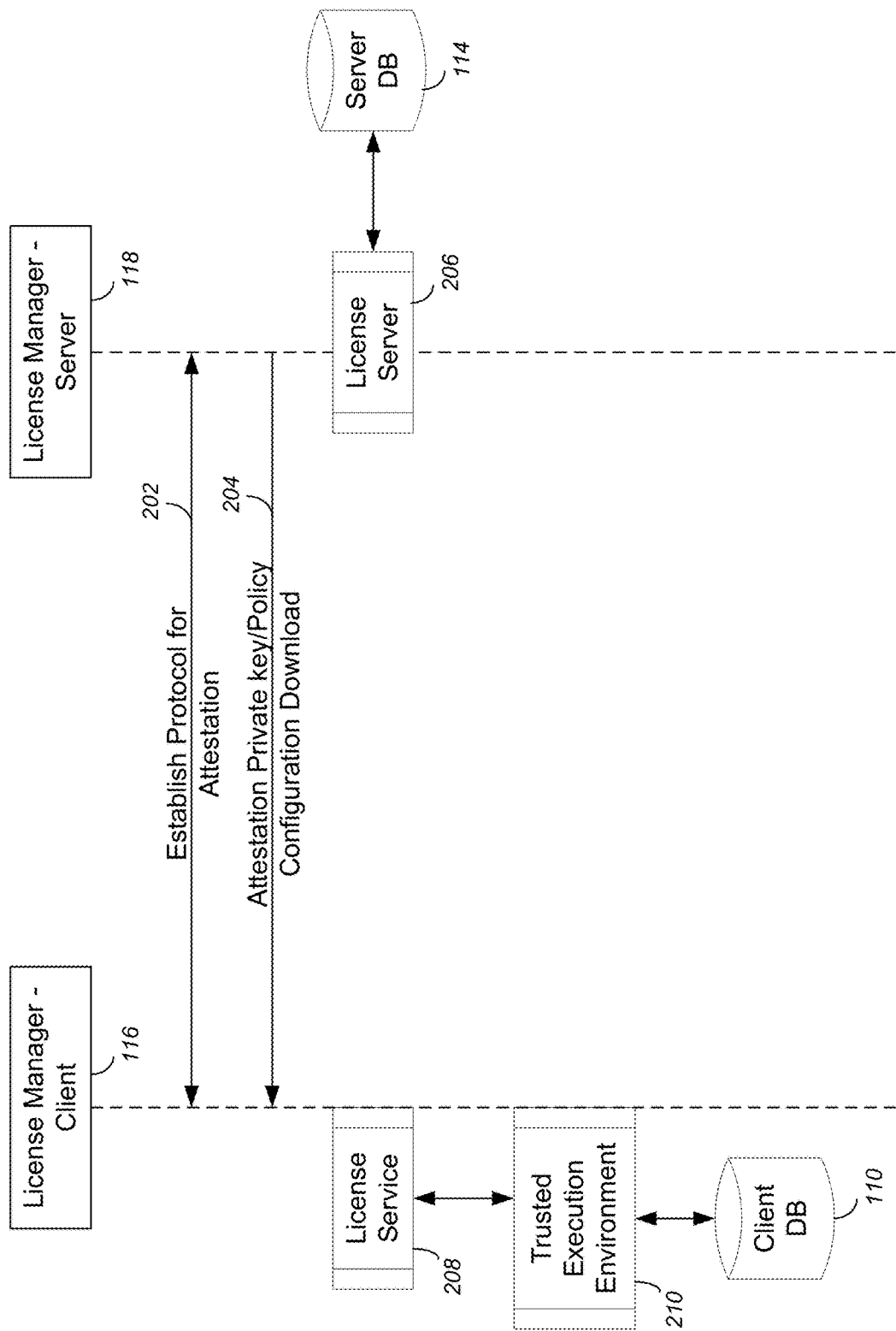
FIG. 2 illustrates the client-server flow of provisioning the client-side components that may be utilized in a token-based licensing schema in accordance with one or more embodiments of the invention.

FIG. 2 illustrates the client-server flow of provisioning the client-side components that may be utilized in a token-based licensing schema in accordance with one or more embodiments of the invention. The tasks/components of/controlled by the license manager client 116 are on the left side of FIG. 2 while the tasks/components of/controlled by the license manager server 118 are on the right side of FIG. 2. The two components 116 and 118 first establish (at 202) a protocol/sigma (e.g., a Diffie Hellman Protocol) for performing remote attestation (e.g., via INTEL SGX OR OPEN ENCLAVE). Further, via client-server communication at 204, the attestation for the private key/policy configuration is downloaded onto the client machine 102. In addition, a license server 206 process of the license manager server 118 processes and stores information relating to public keys, circuits, etc. in the server database 114.

The license manager client 116 includes a license service 208 (e.g., that runs on the client machines 102) as well as a trusted execution environment 210 that communicates with and stores data on the client database 110. In embodiments of the invention, the client database 110 is a trusted storage facility and/or is encrypted using a device bound key. In this regard, tokens can be securely generated in the trusted execution environment 210 and securely stored on the client database 110. Note that the license manager server 118 may be used to establish a secure connection with the client machine (e.g., the license manager client 116) so that certificates can be exchanged. Further, to perform the attestation of the tokens, certificates may be downloaded onto the client side 102 (e.g., via the license manager client 116) and then used to sign the tokens. Such certificates may be delivered/provided via public key/private key encryption techniques.

Figure 3:
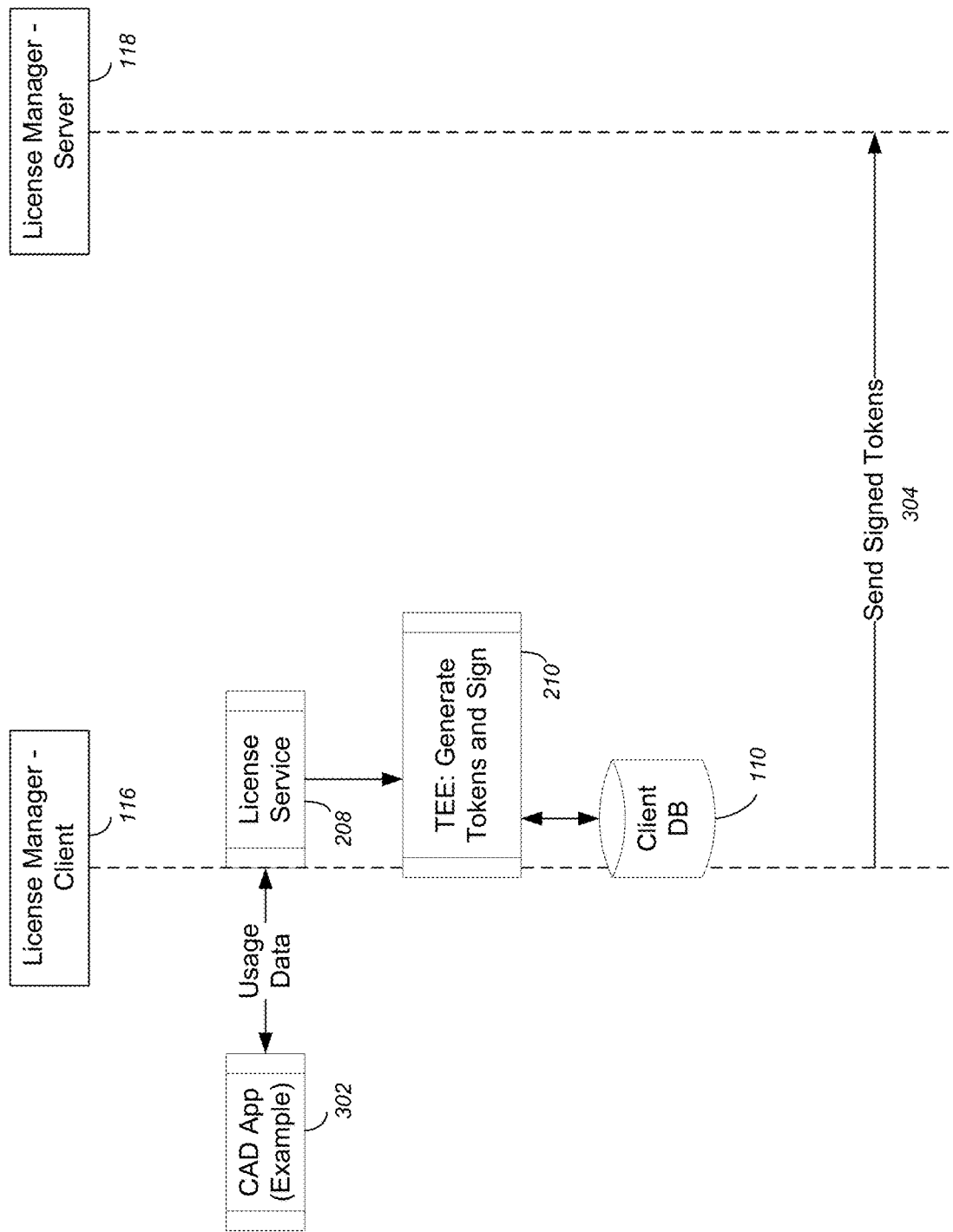
FIG. 3 illustrates token generation in a token-based licensing schema in accordance with one or more embodiments of the invention.

FIG. 3 illustrates token generation in a token-based licensing schema in accordance with one or more embodiments of the invention. The policy manager 106 of FIG. 1 includes the licensing service 208 that analyzes the usage data from one or more applications 302 (e.g., usage data of a computer aided design [CAD] application such as AUTOCAD) as well as the policy information regarding the licensing policy. The usage data may be provided in plain text. Based on the policy, the licensing service 208, via a trusted execution environment (TEE) 208 within the licensing service 208, securely generates tokens. Once generated, the tokens are signed/encrypted using attestation such as a private key and then stored in the client database 110 and sent 304 to the server license manager 118. One may note in a typical use case, tokens are generated based on consumption via an application 302 and the tokens (e.g., that represent the software use) are sent back to the server 104. In one or more embodiments, an authorization/check system may be utilized to ensure that a given customer/client maintains/has purchased a sufficient number of tokens to maintain authorization to use an application 302 (e.g., on an enterprise wide level).

Figure 4:
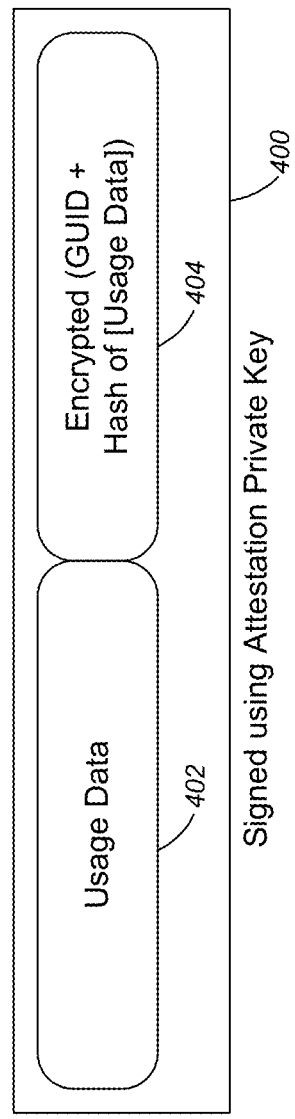
FIG. 4 illustrates the structure of a token in accordance with one or more embodiments of the invention.

FIG. 4 illustrates the structure of a token in accordance with one or more embodiments of the invention. Initially, when a product (e.g., application 302) is installed and the licensing service starts for the first time, provisioning occurs (i.e., a secure execution environment via INTEL SGX OR OPEN ENCLAVE may be established. Such a provisioning process may also be referred to as attestation and therefore includes the generation of a certificate/attestation private key.

After the successful provisioning, the GUID is assigned to the secure hardware component (and the GUID never leaves the enclave in plain text). The token 400 generated on the client 102 includes usage data 402 (e.g., in the form of a JSON [Java Script Object Notation] file) and encrypted information 404 (consisting of the GUID+hash of the usage data 402). In this regard, other than storing the usage data/information 402, a hash is created of the usage data+GUID and then encrypted (producing encrypted data 404). The result is then put into a token 400 and the token is signed using the attestation certificate provisioned during the initial phase. Thus, the usage data 402 is concatenated with the encrypted information 404, placed into a token 400 and then further encrypted/signed with the private key. Once signed, the token has to be validated on the server 104 via use of a public key (e.g., to make sure the signature belongs to a valid user).

Figure 5:
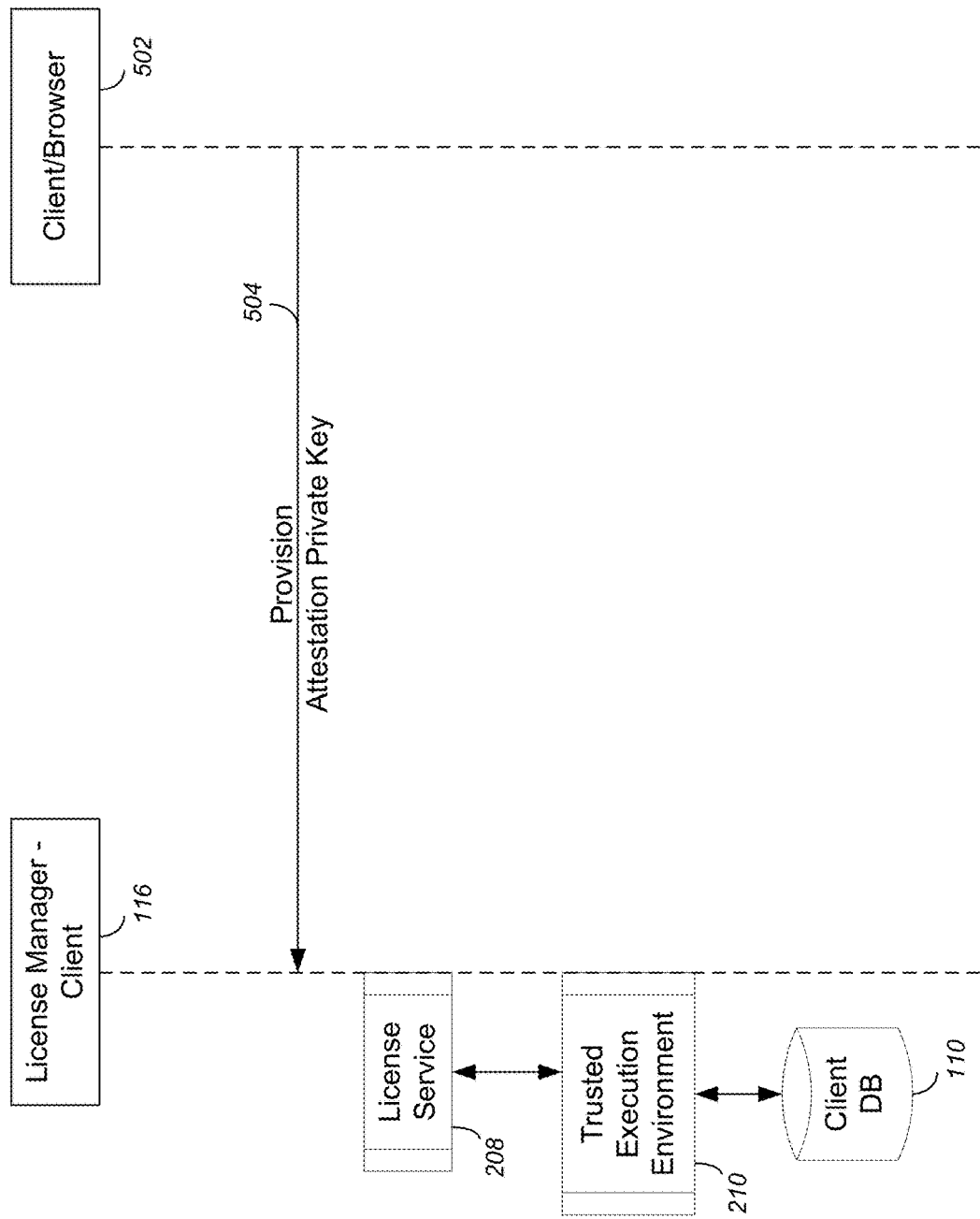
FIG. 5 illustrates the workflow for end-user auditing of tokens in accordance with one or more embodiments of the invention.

It is desirable to enable a user with the capability to audit tokens based on usage data at the client (i.e., rather than allowing a server to maintain control over the tokens without auditing capability). FIG. 5 illustrates the workflow for end-user auditing of tokens in accordance with one or more embodiments of the invention. A user goes to a client portal/browser 502 (e.g., a web browser 502 plugin locally, on an intranet deployed portal, etc.) to check tokens 400. The user can select any of the tokens or all of the tokens that the user wants to double check. The extension/plugin in the browser 502 communicates 504 with the licensing service 208 and sends (to the license manager client 116) all of the tokens for verification. The license manager client 116 verifies the secret part of the data securely (e.g., via the provisioned application [e.g., INTEL GSX]) and displays the result accordingly. In this regard, the license manager decrypts the GUID and the hash of usage data to determine if there is a match with the user's data (e.g., to determine whether the token has been tampered with and was on the same machine).

Utilizing the workflows and systems of FIG. 1-5, embodiments of the invention: prevent token leaks; perform token computation on the client machine and the usage information is not distributed without any safety; provide secure auditability support, and enable easy implementation for single user, small, or enterprise customers. In this regard, customers are empowered with the ability to audit data from their owner computer (or set of computers) in their enterprise at the administrator level. For example, a customer can have full transparency and visibility of which product was used with proofs catering to the user's own machine(s) in an enterprise.

Logical Flow

Figure 6:
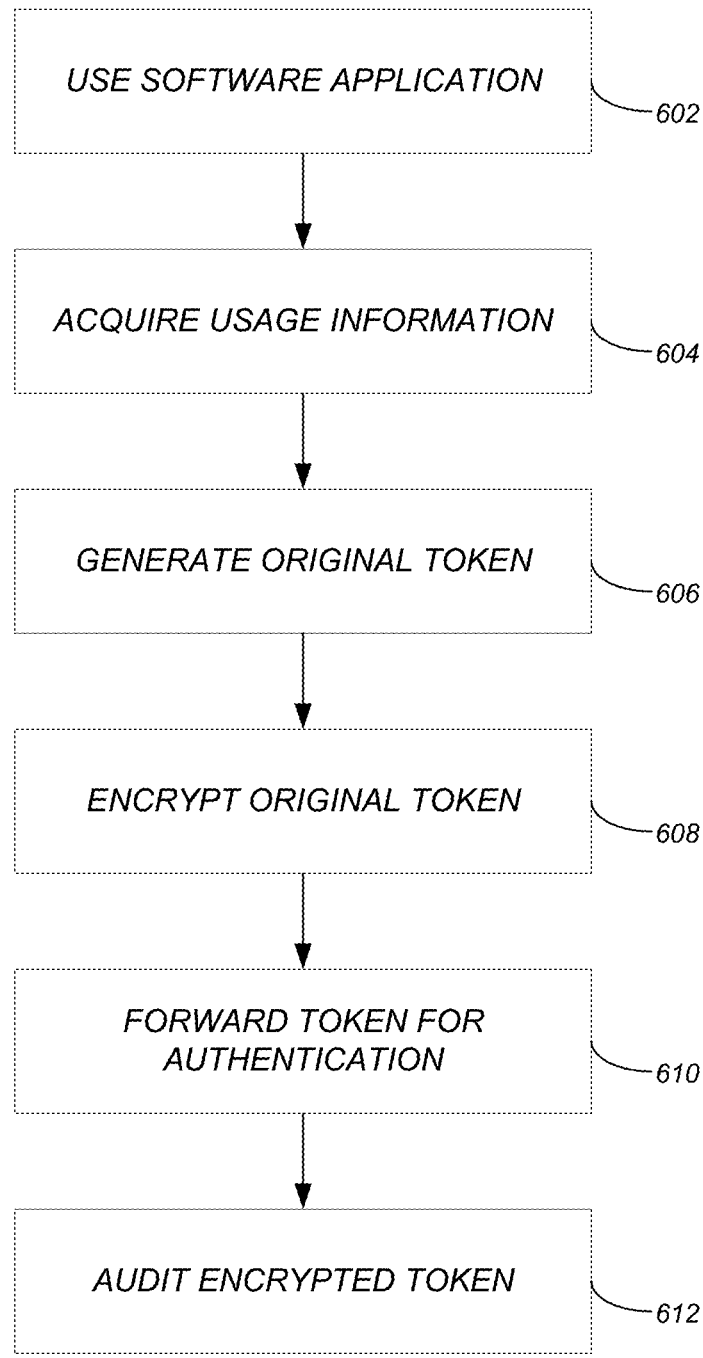
FIG. 6 illustrates the logical flow for licensing a software application in accordance with one or more embodiments of the invention.

FIG. 6 illustrates the logical flow for licensing a software application in accordance with one or more embodiments of the invention.

At step 602, a software application is used on a client computer. Such a use step may include installing the software application (on the client computer) and provisioning the software application. The provisioning includes establishing a trusted execution environment (on the client computer), establishing a trusted storage (for the client computer), and establishing an asymmetric cryptographic system between the client and server computers (where a private key is stored in the trusted storage, and a public key is stored on the server computer, and wherein the private key is used by the trusted execution environment to encrypt the original token).

At step 604, usage information for usage of the software application is acquired.

At step 606, an original token is generated on the client computer. The original token includes the usage information. To generate the original token, the client computer may include a policy manager that utilizes token generation logic.

At step 608, the original token is encrypted resulting in an encrypted token. In one or more embodiments, step 608 is performed in a specific manner (in combination with the other steps of FIG. 6) to ensure security. Specifically, to establish the trusted execution environment (TEE) in step 602, a globally unique identifier (GUID) is assigned to the TEE, and the GUID never leaves the TEE in plain text. Further, the trusted storage stores the usage information and a hash of the usage information+the GUID. The usage information and the hash may then be encrypted and put into the original token (to result in the encrypted token).

At step 610, the encrypted token is forwarded to a server computer that authenticates and process the encrypted token for licensing. The server computer may authenticate the encrypted token using the public key.

At step 612, the encrypted token is audited on the client computer. The auditing includes selecting the encrypted token, receiving the encrypted token from a licensing service (executing on the client computer), verifying (on the client computer) the encrypted token, and displaying the result of the verifying. The auditing may include accessing a portal (e.g., a web browser plugin) that is within a local network of the client computer, where the portal is used to select the encrypted token. The portal communicates with the licensing service executing on the client computer by transmitting the encrypted token for verification. Thereafter, a license manager (within the licensing service) securely verifies a secret part of the token (e.g., the GUID and/or hash). Thus, the auditing is all performed on the client computer by the user on the client machine (i.e., without relying on server generated tokens/auditing/usage information).

Hardware Environment

Figure 7:
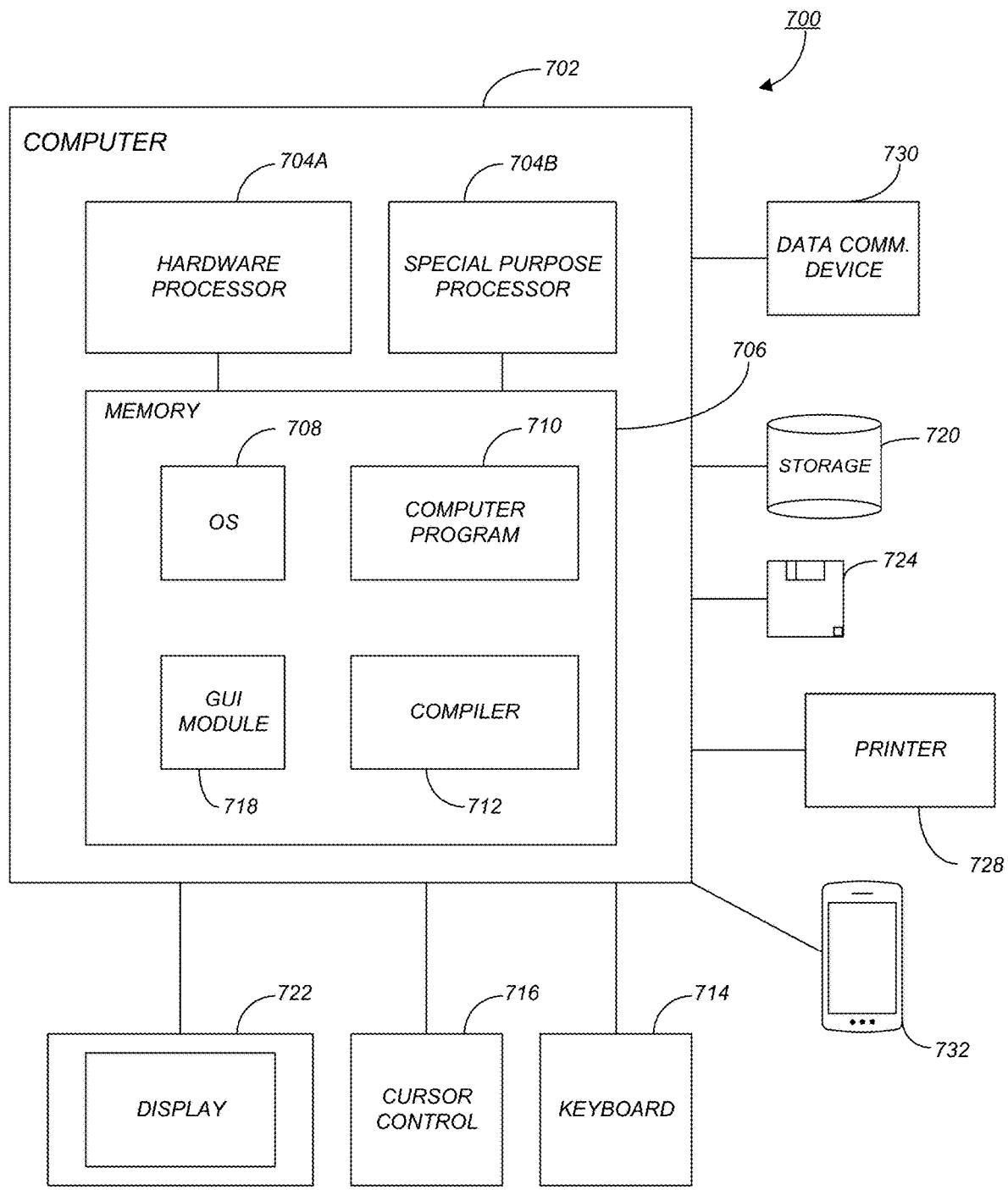
FIG. 7 is an exemplary hardware and software environment used to implement one or more embodiments of the invention.

FIG. 7 is an exemplary hardware and software environment 700 used to implement one or more embodiments of the invention. The hardware and software environment includes a computer 702 and may include peripherals. Computer 702 may be a user/client computer, server computer, or may be a database computer. The computer 702 comprises a general purpose hardware processor 704A and/or a special purpose hardware processor 704B (hereinafter alternatively collectively referred to as processor 704) and a memory 706, such as random access memory (RAM). The computer 702 may be coupled to, and/or integrated with, other devices, including input/output (I/O) devices such as a keyboard 714, a cursor control device 716 (e.g., a mouse, a pointing device, pen and tablet, touch screen, multi-touch device, etc.) and a printer 728. In one or more embodiments, computer 702 may be coupled to, or may comprise, a portable or media viewing/listening device 732 (e.g., an MP3 player, IPOD, NOOK, portable digital video player, cellular device, personal digital assistant, etc.). In yet another embodiment, the computer 702 may comprise a multi-touch device, mobile phone, gaming system, internet enabled television, television set top box, or other internet enabled device executing on various platforms and operating systems.

In one embodiment, the computer 702 operates by the general purpose processor 704A performing instructions defined by the computer program 710 under control of an operating system 708. The computer program 710 and/or the operating system 708 may be stored in the memory 706 and may interface with the user and/or other devices to accept input and commands and, based on such input and commands and the instructions defined by the computer program 710 and operating system 708, to provide output and results.

Output/results may be presented on the display 722 or provided to another device for presentation or further processing or action. In one embodiment, the display 722 comprises a liquid crystal display (LCD) having a plurality of separately addressable liquid crystals. Alternatively, the display 722 may comprise a light emitting diode (LED) display having clusters of red, green and blue diodes driven together to form full-color pixels. Each liquid crystal or pixel of the display 722 changes to an opaque or translucent state to form a part of the image on the display in response to the data or information generated by the processor 704 from the application of the instructions of the computer program 710 and/or operating system 708 to the input and commands. The image may be provided through a graphical user interface (GUI) module 718. Although the GUI module 718 is depicted as a separate module, the instructions performing the GUI functions can be resident or distributed in the operating system 708, the computer program 710, or implemented with special purpose memory and processors.

In one or more embodiments, the display 722 is integrated with/into the computer 702 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 702 according to the computer program 710 instructions may be implemented in a special purpose processor 704B. In this embodiment, the some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program 710 instructions. In one embodiment, the special purpose processor 704B is an application specific integrated circuit (ASIC).

The computer 702 may also implement a compiler 712 that allows an application or computer program 710 written in a programming language such as C, C++, Assembly, SQL, PYTHON, PROLOG, MATLAB, RUBY, RAILS, HASKELL, or other language to be translated into processor 704 readable code. Alternatively, the compiler 712 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 710 accesses and manipulates data accepted from I/O devices and stored in the memory 706 of the computer 702 using the relationships and logic that were generated using the compiler 712.

The computer 702 also optionally comprises an external communication device such as a modem, satellite link, Ethernet card, or other device for accepting input from, and providing output to, other computers 702.

In one embodiment, instructions implementing the operating system 708, the computer program 710, and the compiler 712 are tangibly embodied in a non-transitory computer-readable medium, e.g., data storage device 720 (e.g., which may consist of the client database 110), which could include one or more fixed or removable data storage devices, such as a zip drive, floppy disc drive 724, hard drive, CD-ROM drive, tape drive, etc. Further, the operating system 708 and the computer program 710 are comprised of computer program 710 instructions which, when accessed, read and executed by the computer 702, cause the computer 702 to perform the steps necessary to implement and/or use the present invention or to load the program of instructions into a memory 706, thus creating a special purpose data structure causing the computer 702 to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 702.

Figure 8:
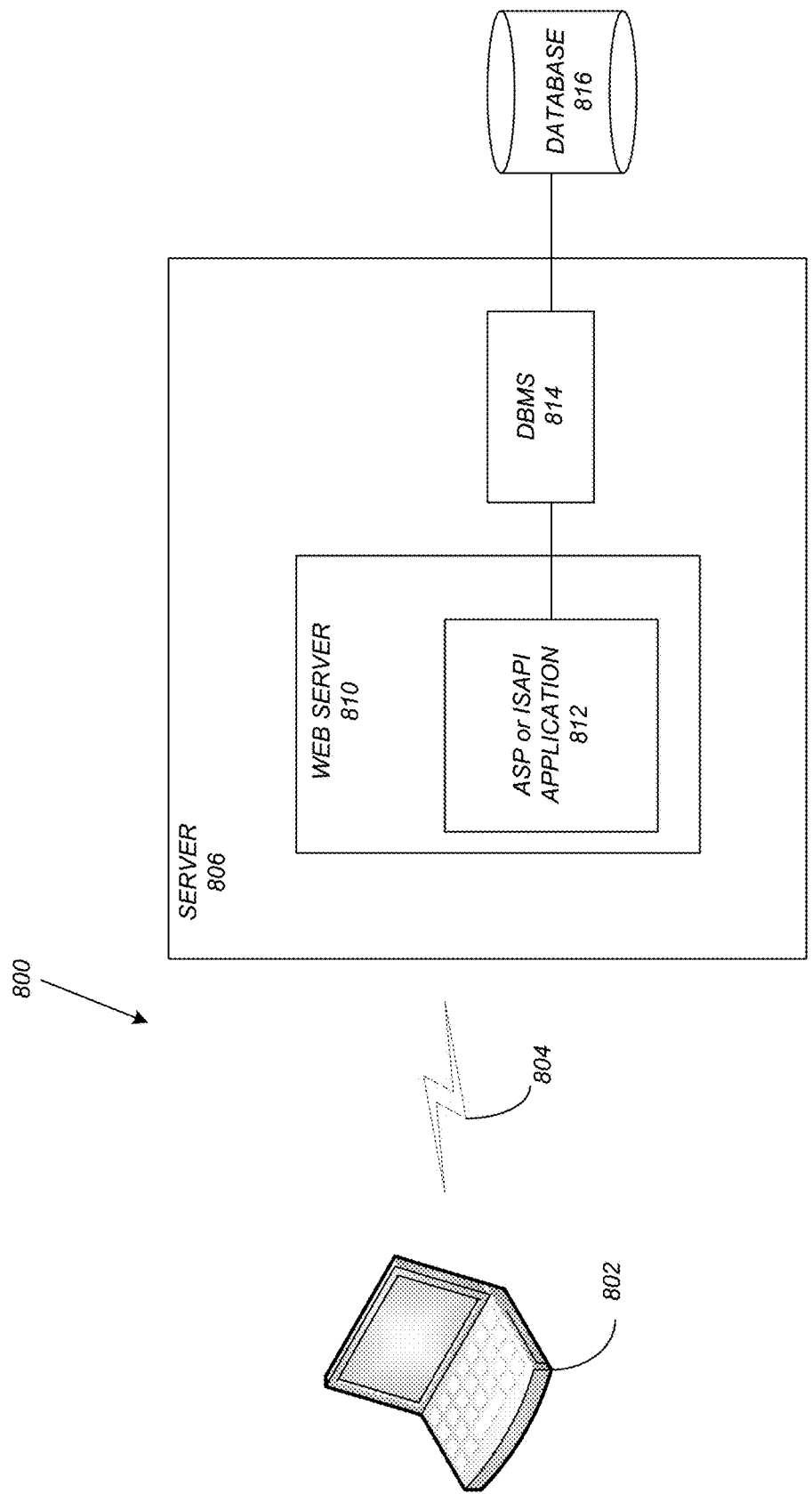
FIG. 8 schematically illustrates a typical distributed/cloud-based computer system using a network to connect client computers to server computers in accordance with one or more embodiments of the invention.

FIG. 8 schematically illustrates a typical distributed/cloud-based computer system 800 using a network 804 to connect client computers 802 (e.g., client computer 102) to server computers 806 (e.g., server computer 104). A typical combination of resources may include a network 804 comprising the Internet, LANs (local area networks), WANs (wide area networks), SNA (systems network architecture) networks, or the like, clients 802 that are personal computers or workstations (as set forth in FIG. 7), and servers 806 that are personal computers, workstations, minicomputers, or mainframes (as set forth in FIG. 7). However, it may be noted that different networks such as a cellular network (e.g., GSM [global system for mobile communications] or otherwise), a satellite based network, or any other type of network may be used to connect clients 802 and servers 806 in accordance with embodiments of the invention.

A network 804 such as the Internet connects clients 802 to server computers 806. Network 804 may utilize ethernet, coaxial cable, wireless communications, radio frequency (RF), etc. to connect and provide the communication between clients 802 and servers 806. Further, in a cloud-based computing system, resources (e.g., storage, processors, applications, memory, infrastructure, etc.) in clients 802 and server computers 806 may be shared by clients 802, server computers 806, and users across one or more networks. Resources may be shared by multiple users and can be dynamically reallocated per demand. In this regard, cloud computing may be referred to as a model for enabling access to a shared pool of configurable computing resources.

Clients 802 may execute a client application or web browser and communicate with server computers 806 executing web servers 810. Such a web browser is typically a program such as MICROSOFT INTERNET EXPLORER, MOZILLA FIREFOX, OPERA, APPLE SAFARI, GOOGLE CHROME, etc. Further, the software executing on clients 802 may be downloaded from server computer 806 to client computers 802 and installed as a plug-in or ACTIVEX control of a web browser. Accordingly, clients 802 may utilize ACTIVEX components/component object model (COM) or distributed COM (DCOM) components to provide a user interface on a display of client 802. The web server 810 is typically a program such as MICROSOFT'S INTERNET INFORMATION SERVER.

Web server 810 may host an Active Server Page (ASP) or Internet Server Application Programming Interface (ISAPI) application 812, which may be executing scripts. The scripts invoke objects that execute business logic (referred to as business objects). The business objects then manipulate data in database 816 through a database management system (DBMS) 814. Alternatively, database 816 (e.g., server database 114) may be part of, or connected directly to, client 802 instead of communicating/obtaining the information from database 816 across network 804. When a developer encapsulates the business functionality into objects, the system may be referred to as a component object model (COM) system. Accordingly, the scripts executing on web server 810 (and/or application 812) invoke COM objects that implement the business logic. Further, server 806 may utilize MICROSOFT'S TRANSACTION SERVER (MTS) to access required data stored in database 816 via an interface such as ADO (Active Data Objects), OLE DB (Object Linking and Embedding DataBase), or ODBC (Open DataBase Connectivity).

Generally, these components 800-816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 802 and 806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 802 and 806. Embodiments of the invention are implemented as a software application on a client 802 or server computer 806. Further, as described above, the client 802 or server computer 806 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for licensing a software application, comprising:
    (a) using, on a client computer, the software application;
    (b) acquiring, on the client computer, usage information for usage of the software application;
    (c) generating, on the client computer, an original token, wherein the original token comprises:
        (i) the usage information; and
        (ii) encrypted information comprising:
            a globally unique identifier (GUID)+a hash of the usage information;
    (d) encrypting, on the client computer, the original token, resulting in an encrypted token;
    (e) forwarding the encrypted token to a server computer, wherein the server computer authenticates and processes the encrypted token for the licensing; and
    (f) auditing the encrypted token on the client computer by:
        (i) selecting, on the client computer, the encrypted token;
        (ii) receiving, on the client computer, the encrypted token from a licensing service executing on the client computer;
        (iii) verifying, on the client computer, the encrypted token; and
        (iv) displaying a result of the verifying.

2. The computer-implemented method of claim 1, further comprising:
    installing the software application on the client computer;
    provisioning the software application on the client computer, wherein the provisioning comprises:
        establishing a trusted execution environment on the client computer;
        establishing a trusted storage for the client computer; and
        establishing an asymmetric cryptographic system between the client computer and the server computer, wherein a private key is stored in the trusted storage, and a public key is stored on the server computer;
    wherein the private key is used by the trusted execution environment to encrypt the original token.

3. The computer-implemented method of claim 2, wherein:
    the trusted execution environment is established by assigning the globally unique identifier (GUID) to the trusted execution environment, wherein the GUID never leaves the trusted execution environment in plain text.

4. The computer-implemented method of claim 3, wherein:
    the trusted storage stores the usage information and the hash of the usage information+the GUID;
    the usage information and the hash are encrypted and put into the original token.

5. The computer-implemented method of claim 4, wherein:
    the server computer authenticates the encrypted token using the public key.

6. The computer-implemented method of claim 1, wherein client computer further comprises a policy manager that utilizes token generation logic to generate the original token.

7. The computer-implemented method of claim 1, wherein the auditing further comprises:
    accessing a portal that is within a local network of the client computer to select the encrypted token;
    the portal communicates with the licensing service executing on the client computer by transmitting the encrypted token for verification; and
    a license manger within the licensing service securely verifies a secret part of the token.

8. A computer-implemented system for licensing a software application, comprising:
    (a) a client computer having a memory;
    (b) a processor executing on the client computer;
    (c) the memory storing a software application and a licensing application that are executed by the processor causing the processor to:
        (i) use the software application;
        (ii) acquire usage information for usage of the software application;
        (iii) generate an original token, wherein the original token comprises:
            (1) the usage information; and
            (2) encrypted information comprising:
                a globally unique identifier (GUID)+a hash of the usage information;
        (iv) encrypt the original token, resulting in an encrypted token;
        (v) forward the encrypted token to a server computer, wherein the server computer authenticates and processes the encrypted token for the licensing; and
        (vi) audit the encrypted token on the client computer by:
            (A) selecting the encrypted token;
            (B) receiving the encrypted token from a licensing service executing on the client computer;
            (C) verifying the encrypted token; and
            (D) displaying a result of the verifying.

9. The computer-implemented system of claim 8, wherein the processor further:
    installs the software application on the client computer;
    provisions the software application on the client computer, wherein the provisioning comprises:
        establishing a trusted execution environment on the client computer;
        establishing a trusted storage for the client computer; and
        establishing an asymmetric cryptographic system between the client computer and the server computer, wherein a private key is stored in the trusted storage, and a public key is stored on the server computer;
    wherein the private key is used by the trusted execution environment to encrypt the original token.

10. The computer-implemented system of claim 9, wherein:
the trusted execution environment is established by assigning the globally unique identifier (GUID) to the trusted execution environment, wherein the GUID never leaves the trusted execution environment in plain text.

11. The computer-implemented system of claim 10, wherein:
the trusted storage stores the usage information and the hash of the usage information+the GUID;
the usage information and the hash are encrypted and put into the original token.

12. The computer-implemented system of claim 11, wherein:
the server computer authenticates the encrypted token using the public key.

13. The computer-implemented system of claim 8, wherein client computer further comprises a policy manager that utilizes token generation logic to generate the original token.

14. The computer-implemented system of claim 8, wherein the processor audits by:
accessing a portal that is within a local network of the client computer to select the encrypted token;
the portal communicates with the licensing service executing on the client computer by transmitting the encrypted token for verification; and
a license manger within the licensing service securely verifies a secret part of the token.

* * * * *